(12) United States Patent
Ferencz et al.

(10) Patent No.: US 6,683,442 B1
(45) Date of Patent: Jan. 27, 2004

(54) SOFT START OF A SWITCHING POWER SUPPLY SYSTEM

(75) Inventors: Andrew Ferencz, Southborough, MA (US); Gregory A. Zvonar, Winchester, MA (US)

(73) Assignee: Galaxy Power, Inc., Westborough, MA (US)

( * ) Notice: Subject to any disclaimer, the term of this patent is extended or adjusted under 35 U.S.C. 154(b) by 0 days.

(21) Appl. No.: 10/219,910

(22) Filed: Aug. 15, 2002

(51) Int. Cl.$^7$ ............................. H02M 7/10; G05F 1/40
(52) U.S. Cl. ......................... 323/274; 323/901; 363/49
(58) Field of Search ................. 323/901, 908, 323/274, 275; 363/49

(56) References Cited

U.S. PATENT DOCUMENTS

| | | | | |
|---|---|---|---|---|
| 4,233,557 A | * | 11/1980 | Alberkrack | 323/283 |
| 4,621,313 A | * | 11/1986 | Kiteley | 363/49 |
| 4,716,510 A | * | 12/1987 | Pace et al. | 363/49 |
| 5,015,921 A | * | 5/1991 | Carlson et al. | 315/208 |
| 5,285,372 A | * | 2/1994 | Huynh et al. | 363/132 |
| 5,451,750 A | * | 9/1995 | An | 219/716 |
| 5,949,633 A | * | 9/1999 | Conway | 361/38 |

* cited by examiner

Primary Examiner—Bao Q. Vu
(74) Attorney, Agent, or Firm—Cesari and McKenna, LLP

(57) ABSTRACT

A synch FET power supply uses a plurality of electronic switches to periodically connect the primary of a transformer to a direct current input source of power to generate a time varying magnetic field. The time varying magnetic field is coupled to two secondary windings. An electronic switch connected to each secondary winding periodically connects its secondary to the other output terminal. A reference voltage is applied to the control circuits, and the control circuits adjust the switches so that the output voltage tracks the reference voltage. Logic AND gates control the "turn on" signals to the electronic switches in the secondary circuits so that the secondary windings are not connected to an output terminal until a "synch FET enable" signal is applied to the AND gates. During soft start, the secondary windings remain disconnected from an output terminal until a "synch FET enable" signal is applied to an input of the logic AND gates, and since the secondary windings do not provide a complete circuit between the output terminals, no power flows into the synch FET power supply even though a back bias is applied between the output terminals by another power source.

12 Claims, 10 Drawing Sheets

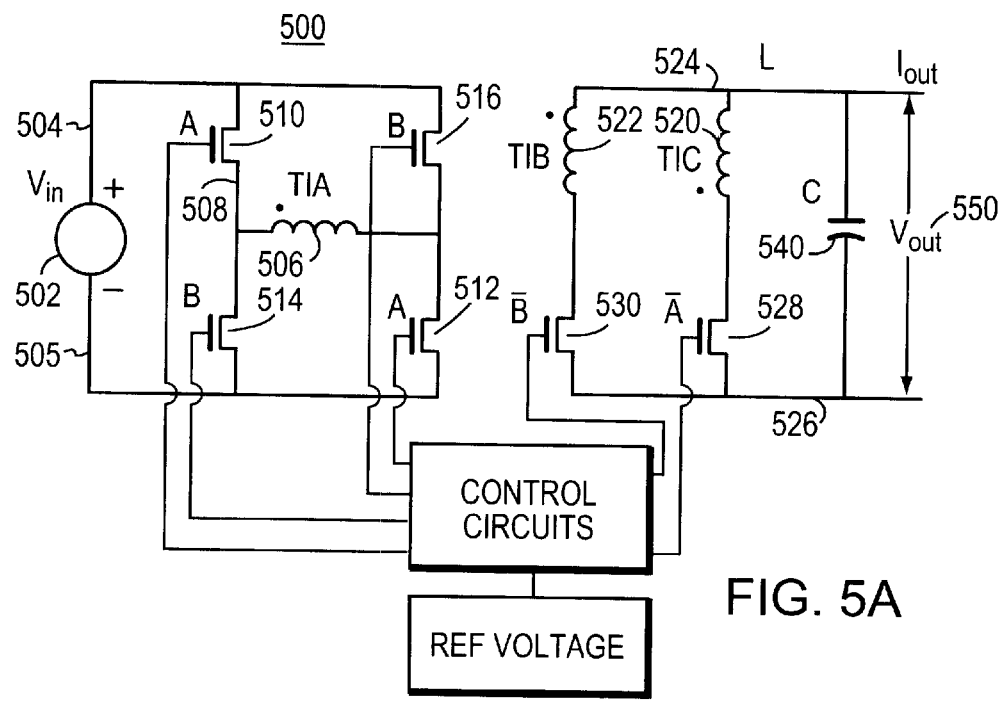
FIG. 5A
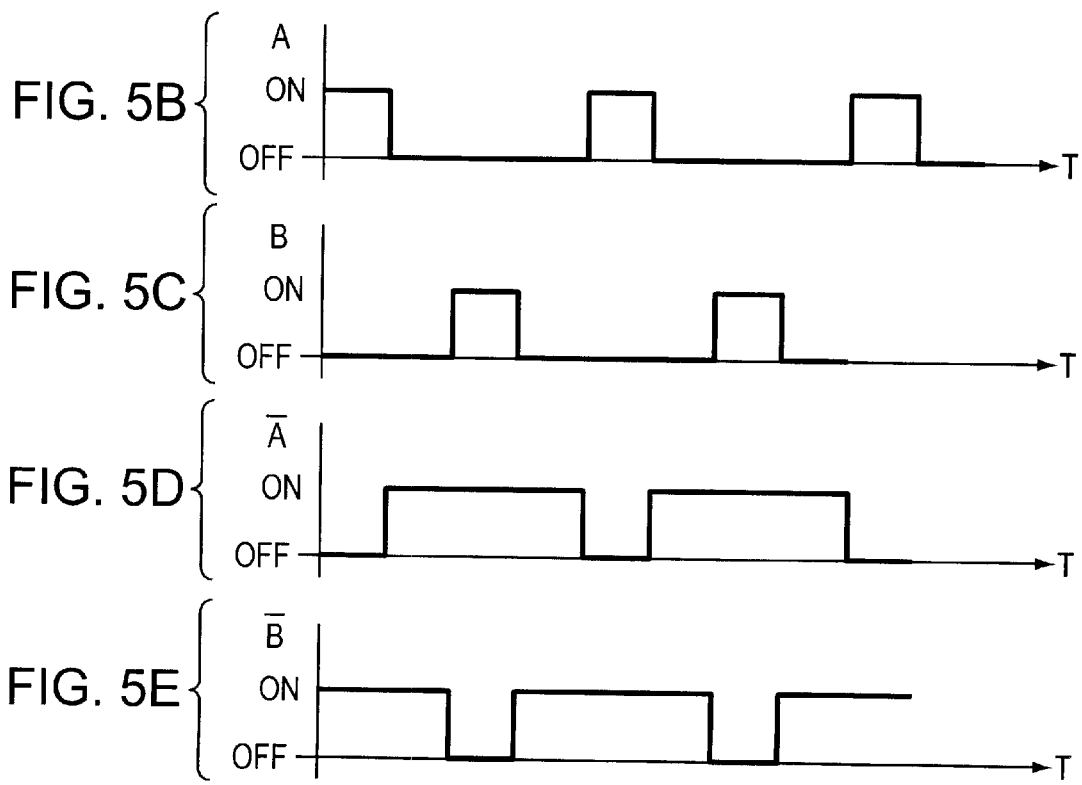
(PRIOR ART)

SOFT START OF A SWITCHING POWER SUPPLY SYSTEM

BACKGROUND OF THE INVENTION

1. Field of the Invention

This invention relates to switching power supplies, and more particularly to soft start during switch on of a plurality of power supplies connected in a system.

2. Background Information

Switching power supplies are often designed to produce one DC output voltage from a DC input source of power. When it is desired to have power supplied at a plurality of different DC voltages, a plurality of single voltage switching power supplies are assembled into a system, with each desired voltage supplied by a different switching power supply. The plurality of single voltage switching power supplies are then connected to the source of input DC power, and each supplies power at its designated output voltage.

A system designer assembles as many single voltage switching power supplies as he needs to supply power to the loads in the system. Often the loads are computer chips, that is the loads are a group of integrated circuits. The integrated circuits are often connected to the same system ground, and the integrated circuits are also connected together by signal leads between the integrated circuits. Thus, when voltage is applied by one of the switching power supplies to a particular integrated circuit, this voltage may appear across other of the integrated circuits.

"Soft start" of power supplies is a term used to describe bringing the output voltage of the power supply up gradually, usually bringing the voltage up as a linear function of time. When several switching poser supplies are connected in a system, it may be desired to bring up the various voltages in an orderly sequence, so that one voltage begins coming up before a different voltage becomes coming up. To bring up the various voltages up at different times requires that the different individual switching power supplies bring up their voltages at different times.

Since the integrated circuits being supplied by the different switching power supplies are all connected together, voltages different from normal operating voltages may develop between the integrated circuits during a soft start operation. Uncontrolled voltage differences caused by soft start of different switching power supplies may injure the integrated circuits. System designers use a variety of strategies to protect their integrated circuits during a soft start operation.

Turning now to FIG. 1, a typical arrangement 100 of a single switching power DC to DC converter power supply is shown. Power source 102 supplies DC power to the switching power supply 104 through connection 103. Typically, a switching power supply uses Field Effect Transistors (FETs) as switches, and the FETs are switched synchronously by the switching power supply 104. Such a switching power supply is often referred to as a Synch FET power supply. Synch FET power supply 104 supplies power to a load 106 through connection 105. The load is often an integrated circuit.

The Synch FET power supply receives power at an input voltage and input current through connection 103, and supplies power through connection 105 at an output voltage and output current, where the output voltage is typically different from the input voltage.

Turning now to FIG. 2A system 200 is a design using three single voltage synch FET power supplies 202, 203, 204 to supply power at three different voltages. For example, synch FET power supply 202 supplies power at 1.5 Volts to bus 202B, synch FET power supply 203 supplies power at 2.5 Volts to bus 203B, synch FET power supply 204 supplies power at 3.3 Volts to bus 204B. Typically, each synch FET power supply may supply from around 100 Watts to around 500 Watts of power. Input power supply line 206 supplies DC power to each of the synch FET power supplies 202, 203, 204 at a convenient input voltage.

Diode 210 and diode 212 are specified by a system designer in order to protect integrated circuits supplied by power by bus 202B, 203B, 204B during soft start of the power supplies.

Turning now to FIG. 2B, graphs 220 show voltage on bus 202B, 203B, 204B during soft start of the synch FET power supplies 202, 203, 204. First, the low voltage power supply is enabled at time 231, graph 222 rises linearly with time during portion 222A, and then stabilizes at the desired output voltage 1.5 Volt. Diode 210 pulls up bus 203B, and diode 212 pulls up bus 204B so that bus 203B and bus 204B follow bus 202B as synch FET power supply 202 is turned on using soft start. Both diodes 210 and 212 have an internal voltage drop, and so bus 203B voltage remains less than bus 202B voltage, and bus 204B voltage remains less than bus 203B voltage, as shown in graph 200, between time 231 and time 232.

At time 232 synch FET power supply 203 is turned on using soft start, and the voltage on bus 203B begins to rise as shown by graph 224. During segment 224A of graph 224 the voltage rises linearly and then stabilizes at the desired output voltage of 2.5 Volt.

Diode 210 prevents a current flow into bus 202B from 203B, and so bus 202B is not affected by activation of synch FET power supply 203, as shown by graph 222. However, diode 212 pulls up bus 204B so that the voltage on bus 204B follows that of bus 203B, but remains less by the voltage drop across diode 212, as shown by graph 226.

At time 223 synch FET power supply 204 is turned on by soft start. The voltage on bus 204B begins to rise linearly as shown by graph 226 at section 226A, and then stabilizes at the desired output voltage of 3.3 Volt. Diode 212 prevents current flow from bus 204B to bus 203B, and so the voltage of bus 203B is not affected by the rise of voltage applied by synch FET power supply 204 to bus 204B.

The use of diodes 210 and 212 by a system designer who combines a plurality of single voltage synch FET power supplies to supply a plurality of voltages to an integrated circuits as loads work by pulling up the un-activated power buses, and so the diodes prevent unwanted large voltage differences to develop across the loads, typically integrated circuit loads (not shown in FIG. 2A).

However, the diodes 210, 212 cause a problem in the un-activated synch FET power supplies, and the problem is called the "back bias" problem.

The back bias problem is illustrated in FIGS. 3A, 3B, 3C. FIG. 3A illustrates a synch FET DC to DC converter power supply 300. Input power and current are supplied on bus 302 at an input voltage $V_{in}$. Output power and current are supplied by the DC/DC converter 304 on output bus 305 at a desired output voltage $V_{out}$. A sense voltage line 308, shown as directly connected to output bus 305 is used by DC/DC converter 304 to monitor and control the output voltage on output bus 305. A reference voltage is supplied on line 306 to DC/DC converter 304. The DC/DC converter 304 regulates the output voltage to match the reference voltage on line 306.

FIG. 3B is a graph showing operation of synch FET DC to DC converter power supply 300 when the output voltage is pulled up above the reference voltage, as occurs through diodes 210 and 212 before the higher voltage synch FET power supplies are turned on.

Back bias voltage 310 is applied to the synch FET power supply, for example by a diode such as diode 210, 212. At time 312 the synch FET power supply 304 is turned off and the back bias voltage 310 has no effect. At time 314 synch FET power supply 304 is turned on and the reference voltage, shown as the dotted line graph 316, is less than the output voltage. The output voltage of synch FET 304 is driven down during segment 310A of graph 310 until time 318, and at time 318 the reference voltage is caused by control circuits (not shown) to rise linearly in order to implement soft start. Segment 310B of graph 310 shows the output voltage rising with the rise in reference voltage, as the reference voltage rises linearly with time. At time 320 the rise in reference voltage reaches its stable value, and the output voltage stabilizes at the desired output voltage $V_{out}$ as shown by segment 310C of graph 310.

The drop in output voltage after time 314 shown by segments 310A and 310B of graph 310 is very undesirable. This drop in output voltage causes power to flow from the source of back bias voltage shown at time 312 into synch FET DC/DC converter 304.

Undesirable current flow, and also power flow, into synch FET DC/DC converter 304 is shown in FIG. 3C. Graph 350 shows current flow in and out of synch FET power supply 304. Segment 350A illustrates undesirable power flow into DC/DC converter 304 from output bus 305, where the source of power is the source of the back bias voltage shown by graph 310 at time 312. After time 354 the output voltage rises above the back bias, and power flow begins from, rather than to, DC/DC converter 304, as shown by segment 350B of graph 350.

It is desirable to design a synch FET power supply such as synch FET DC/DC converter 304 that can be connected in a system 200, and not have power flow into the synch FET DC/DC converter when a back bias is applied to the output bus 305 of the synch FET DC/DC converter.

Turning now to FIG. 4A, there is shown another system 400 arrangement which attempts to solve the voltage spread applied to integrated circuit loads during soft start, and also produces the back bias problem illustrated in FIGS. 3A, 3B, 3C. Representative integrated circuit loads are shown in the dotted line box 402 as IC1 402A, IC2 402B, and IC3 402C.

Synch FET power supply 410 supplies bus 410B with a high voltage, for example 3.3 Volt. Synch FET power supply 412 supplies bus 412B with a medium voltage, for example 2.5 Volt. Synch FET power supply 414 supplies bus 414B with a low voltage, for example 1.5 Volt. Bus 410B supplies the high voltage to IC1 402A. Bus 412B supplies the medium voltage to IC2 402B. Bus 414B supplies the low voltage to IC3 402C.

A system design 400 using the three synch FET power supplies 410, 412, 414 along with integrated circuits IC1 402A, IC2 402B, IC3 402C is created by a systems designer. Bus 414B supplies the low voltage to IC3 402C. In the absence of system design to protect the integrated circuits 402A, 402B, 402C, after bus 410B rises to its high voltage, for example 3.3 Volt, then signal lines 403 can apply the high voltage to IC3 402C. IC3 is designed for a low voltage power supply provided by bus 414B, and so the high voltage supplied by bus 410B through signal lines 403 could damage or destroy IC3 402C.

Likewise, as bus 410B rises to its high voltage operating voltage, signal lines 405 can apply the high voltage to IC2 402B. Again, IC2 402B may be damaged by the voltage applied by bus 410B, as IC2 is designed for a lower voltage ordinarily supplied by medium voltage bus 412B.

FIG. 4B is a graph showing soft start of the various synch FET power supplies 410, 412, 414. First, at time 420 the high voltage synch FET power supply 410 is enabled, and the voltage on bus 410B begins to rise, as shown by graph 410C. Linear regulator 422 brings up bus 412B, and linear regulator 424 brings up bus 414B. The linear regulators 422, 424 protect the load integrated circuits 402A, 402B, 402C by insuring that no large voltage difference exceeding the design limits of the integrated circuits is applied by the overall system 400 to an integrated circuit.

Then at time synch FET power supply 412 is turned on using soft start. And at time 424 synch FET power supply 414 is turned on using soft start.

Again, however, a back bias is applied to each of the lower voltage synch FET power supplies as the higher voltage synch FET power supply is enabled during soft start. As illustrated in FIGS. 3A, 3B, 3C power will flow into the back biased synch FET power supply as that synch FET power supply is enabled using soft start.

There is needed a design of a synch FET power supply that can be connected in a system, and not have power flow into the synch FET power supply when a back bias is applied to the output bus of the synch FET power supply during soft start, where the back bias exceeds the desired output voltage for a period of time.

SUMMARY OF THE INVENTION

A synch FET power supply uses a plurality of electronic switches to periodically connect the primary of a transformer to a DC input source of power, and to periodically reverse the primary connection to the source of DC power so as to cause the primary of the transformer to generate a time varying magnetic field. The time varying magnetic field is coupled to two secondary windings. In an exemplary embodiment of the invention, the secondary can be center tapped, and the center tap provides one of the output terminals of the synch FET power supply. An electronic switch connected to each secondary winding periodically connects its secondary to the other output terminal. The switches are timed so that, for example, the center tap output terminal is the positive DC output terminal, and the other ends of the two secondary windings provide the negative DC output terminal. A reference voltage is applied to the control circuits, and the control circuits adjust the switches so that the output voltage tracks the reference voltage.

Logic AND gates control the "turn on" signals to the electronic switches in the secondary circuits so that the secondary windings are not connected to an output terminal until a "synch FET enable" signal is applied to the AND gates. During soft start, the secondary windings remain disconnected from an output terminal until a "synch FET enable" signal is applied to an input of the logic AND gates, and since the secondary windings do not provide a complete circuit between the output terminals, no power flows into the synch FET power supply even though a back bias is applied between the output terminals by another power source.

In another aspect of the invention, a filter is placed between the output of the AND gates and the switches which they drive. The filter turns off the switches when the AND gate remains on for a long time, and the filter prevents very short pulses from being applied to the switches.

Other and further aspects of the present invention will become apparent during the course of the following description and by reference to the accompanying drawings.

BRIEF DESCRIPTION OF THE DRAWINGS

The invention description below refers to the accompanying drawings, of which:

FIG. 5A is a block diagram of a synch FET direct current to direct current power supply;

FIG. 5B is a graph showing control signals versus time;

FIG. 5C is a graph showing control signals versus time;

FIG. 5D is a graph showing control signals versus time;

FIG. 5E is a graph showing control signals versus time;

DETAILED DESCRIPTION OF AN ILLUSTRATIVE EMBODIMENT

Figure 1:
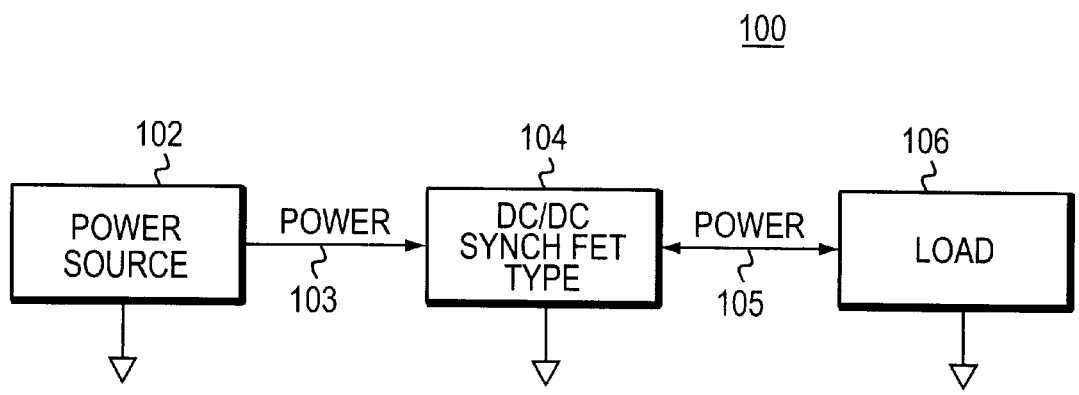
FIG. 1 is a block diagram of a synchronous FET power supply for converting direct current to direct current.
Figure 2A:
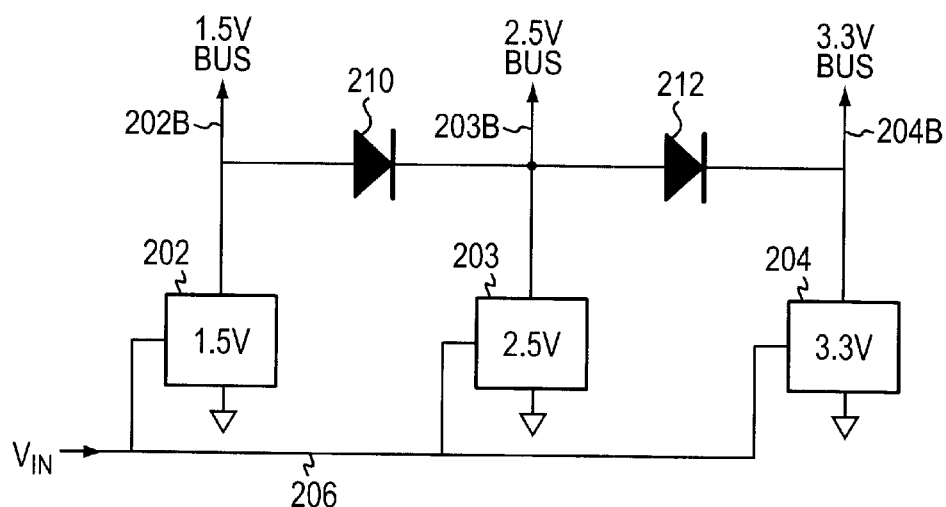
FIG. 2A is a block diagram of a system of synch FET power supplies.
Figure 2B:
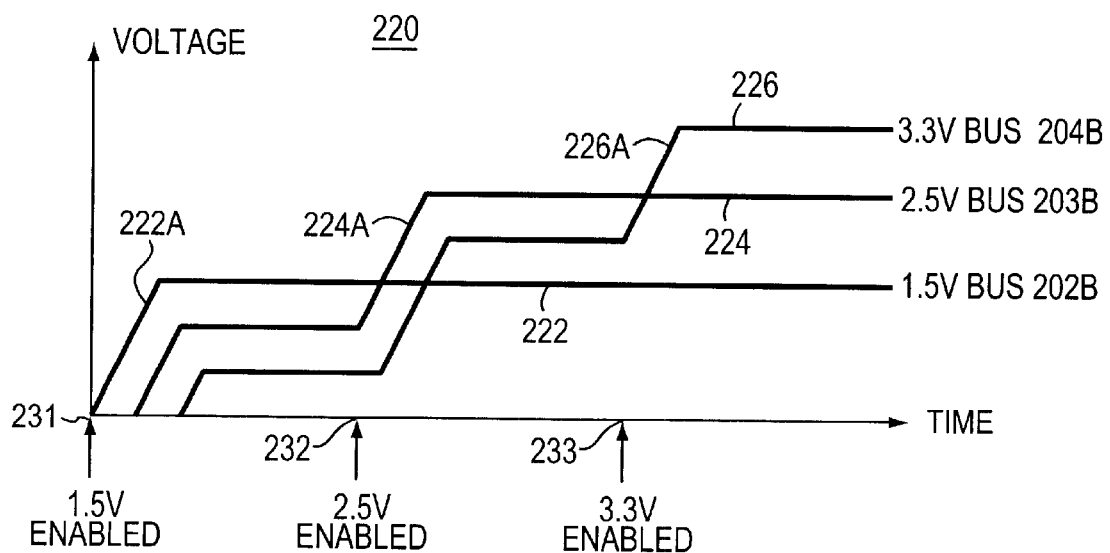
FIG. 2B is a graph of voltages during soft start.
Figure 3A:
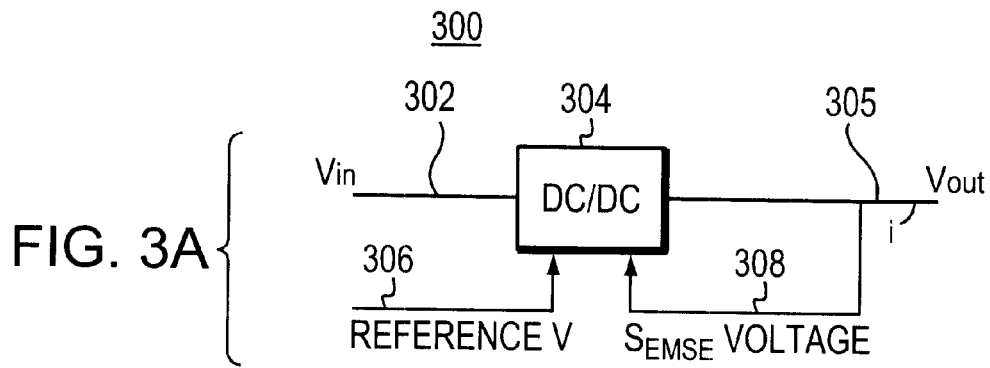
FIG. 3A is a block diagram of a system using a plurality of synch FET power supplies is.
Figure 3B:
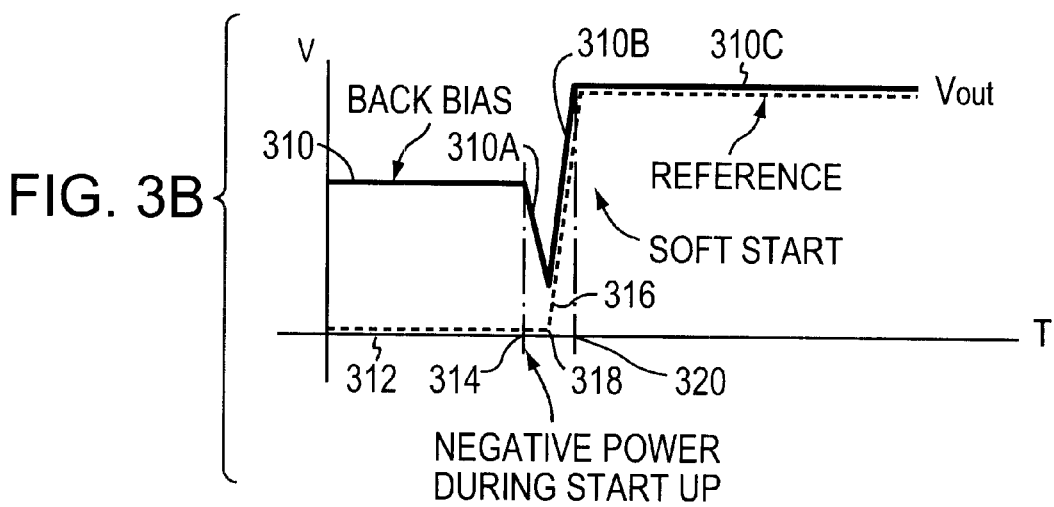
FIG. 3B is a graph showing voltage versus time.
Figure 3C:
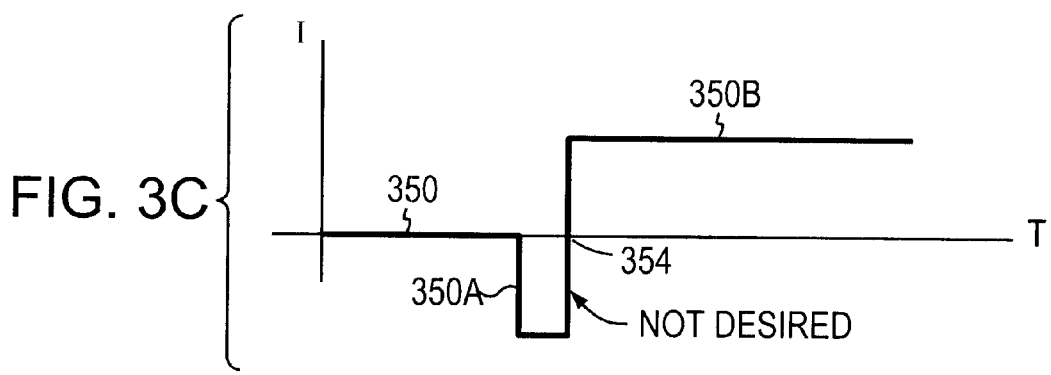
FIG. 3C is a graph showing a graph of voltage versus time.
Figure 4A:
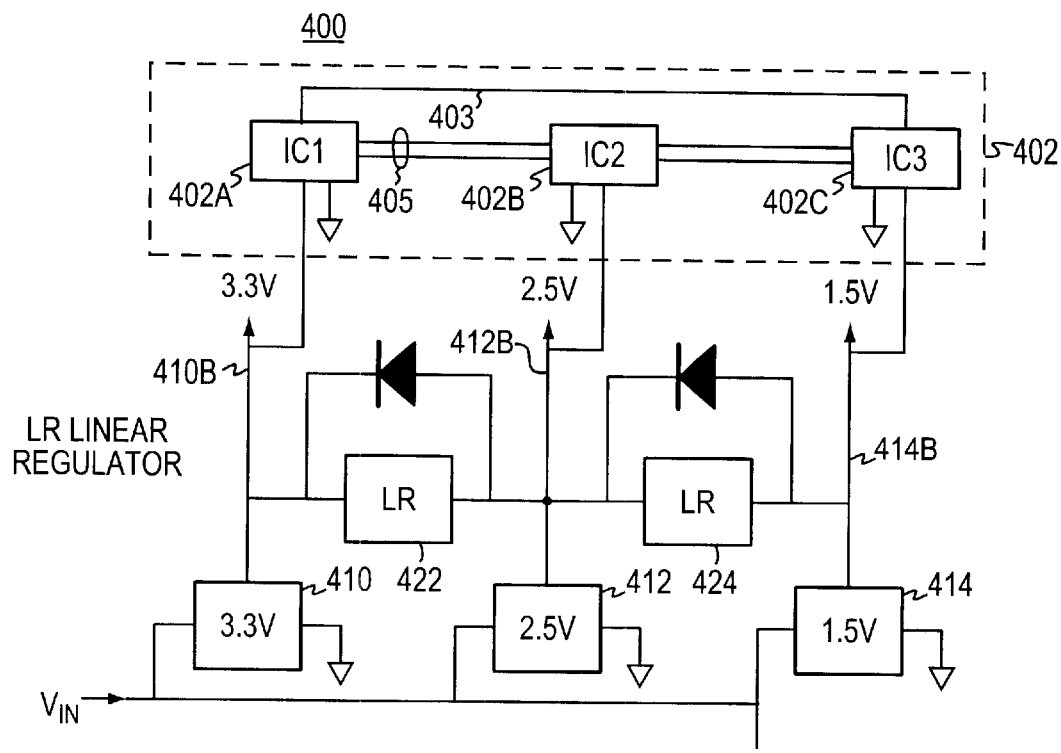
FIG. 4A is a block diagram of a system using a plurality of synch FET power supplies.
Figure 4B:
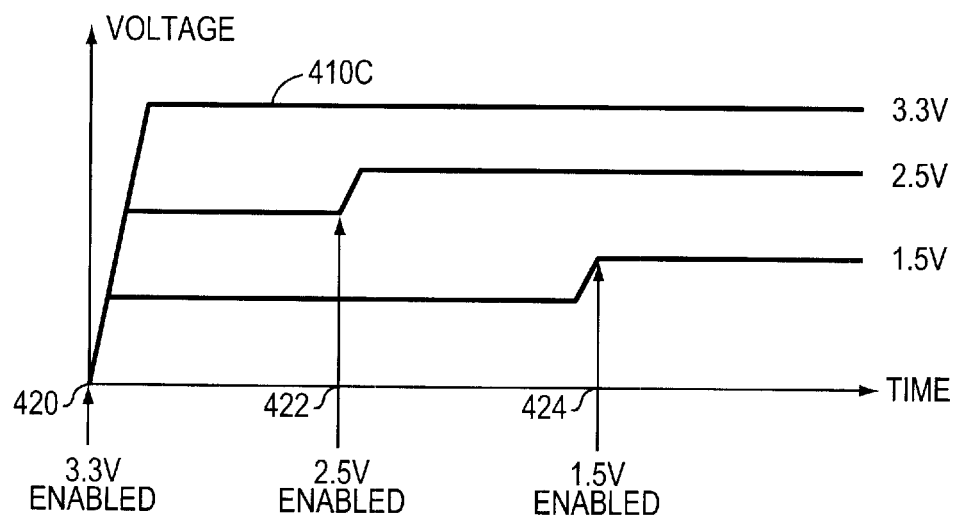
FIG. 4B is a graph showing voltages versus time.

Turning now to FIG. 5A, operation of the switches in a synchronous switched DC to DC converter power supply 500 is shown. Often a Field Effect Transistor (FET) is used for each switch. Thus the power supply is referred generically as a synch FET power supply. As will be evident to those skilled in the art, any type of convenient switch can be used, and the name "synch FET power supply" does not limit the invention to the use of FETs as switches.

Direct Current (DC) power source 502 supplies power at an input voltage $V_{in}$ on input bus 504. In a first half cycle, transformer primary winding 506 is connected so that the "dotted" end 508 of the primary winding is first connected to the positive bus 504 through switch 510 and the un-dotted end is connected to the negative input bus 505 through switch 512. Current then flows through the primary winding from the dotted end to the un-dotted end.

During a second half cycle, transformer primary winding 506 is connected so that the "dotted" end 508 of the primary winding is connected to the negative input bus 505 through switch 514 and the un-dotted end is connected to the positive input bus 504 through switch 516. Current flow through the primary winding is then "in" at the un-dotted end and "out" through the dotted end 508.

Switches 510 and 512 are marked as the "A" switches because they close simultaneously. Further, switches 514 and 516 are marked as the "B" switches because they close simultaneously. FIG. 5B is a graph showing the "on" times of the A switches, 510 and 512. FIG. 5C is a graph showing the "on" times of the "B" switches 514 and 516.

Turning now to the secondary circuits, there are two secondary windings 520 and 522. The two secondary windings 520 522 may be made from a center tapped secondary coil, where positive output bus 524 is connected to the center tap. Accordingly, the two secondary windings are joined at the positive output bus 524. Secondary 520 is connected at its dotted end to the negative output bus 526 by switch 528. Secondary 522 is connected at its un-dotted end to negative output bus 526 by switch 530.

Switch 528 is marked as "not A" because it is turned off when the A switches are on, and is turned on when the A switches are turned off. Switch 530 is marked as "not B" because it is turned off when the B switches are on, and is turned on when the B switches are turned off.

Turning now to FIG. 5D, there is a graph showing when switch 528 is turned on. Note that switch 528 is on when the A switches shown in FIG. 5B are off, and switch 528 is off when the A switches of FIG. 5B are on.

Turning now to FIG. 5E, there is a graph showing when switch 530 is turned on. Note that switch 530 is on when the B switches shown in FIG. 5C are off, and switch 530 is off when the B switches of FIG. 5C are on.

A DC output voltage 550 is produced between the positive output bus 524 and negative output bus 526, and is shown as $V_{out}$. The output current is indicated as $I_{out}$.

A filter capacitor C 540 is shown. Filter capacitor C 540 reduces the ripple voltage in the DC output delivered between positive output bus 524 and negative output bus 526.

Figure 6A:
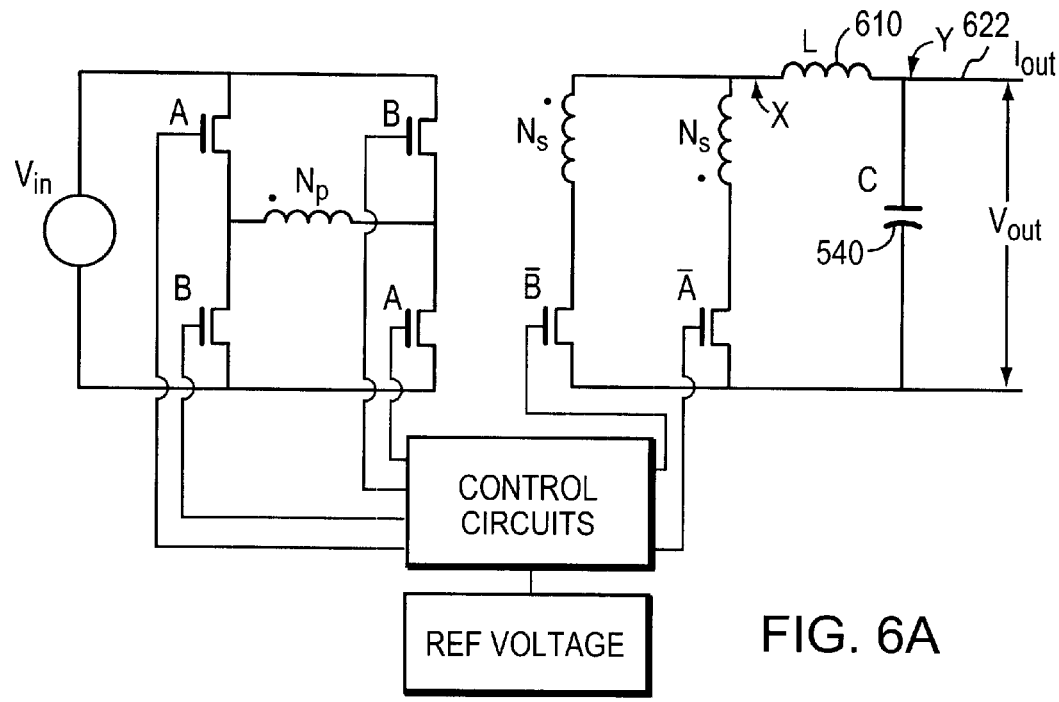
FIG. 6A is a block diagram of a synch FET direct current to direct current power supply.

Turning now to FIG. 6A, there is shown a synch FET power supply 600 similar to synch FET power supply 500. Synch FET power supply 600 has the addition of a filter inductor 610. Filter inductor 600 reduces the ripple in the output DC voltage below that achieved by capacitor C 540 only.

Figure 6B:
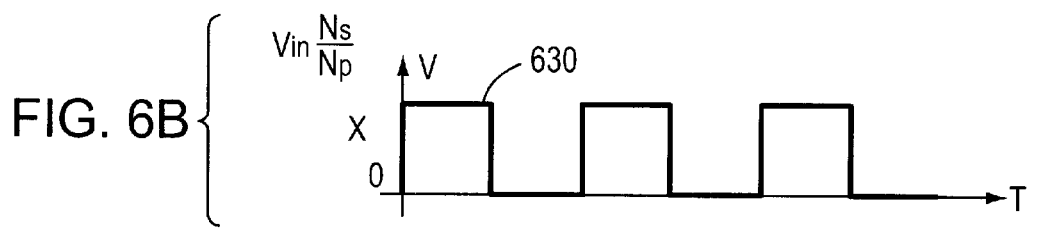
FIG. 6B is a graph showing voltage versus time.

FIG. 6B is a graph 630 giving the voltage observed at point X. Graph 630 shows the output voltage fluctuating between the value of "0" and the high value given by the ratio of the number of turns in the primary and the secondary windings, times the input voltage. That is, the voltage at point X 620 varies between zero and:

V(input)*(Number of secondary Turns)/(Number of Primary Turns)

Figure 6C:
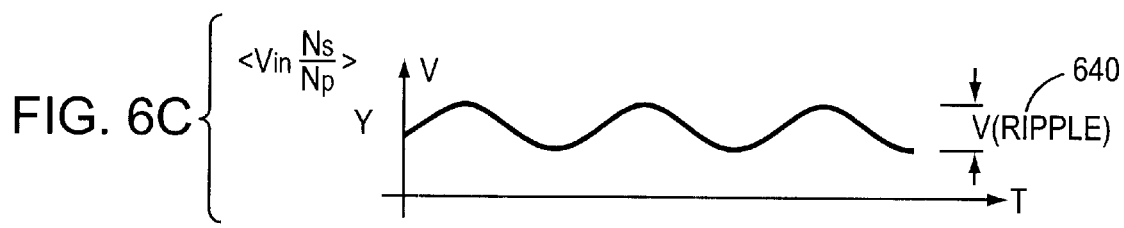
FIG. 6C is a graph showing voltage versus time.

Turning now to FIG. 6C, a time average voltage observed at point Y 622, the output voltage, is shown. Rather than fluctuating between zero and a value, the voltage at point Y 622 has a steady DC component and a time varying component designated as ripple voltage 640. Introduction of filter inductor 610 reduces the ripple voltage to below that produced by the synch FET power supply 500, which does not have a filter inductor.

The output voltage 550 produced depends on a number of factors, including the input voltage $V_{in}$ between positive input bus 504 and negative input bus 505.

The output voltage is given by the expression:

V(input)*(Number of secondary Turns)/(Number of Primary Turns)*(T(on)/T)

Here, T(on)/T is the duty cycle of the current flow through the primary winding 506 of the transformer. T(on) is the time that current flow is on while a set of primary switches is closed, and T is the length, in time, of a cycle.

Figure 7A:
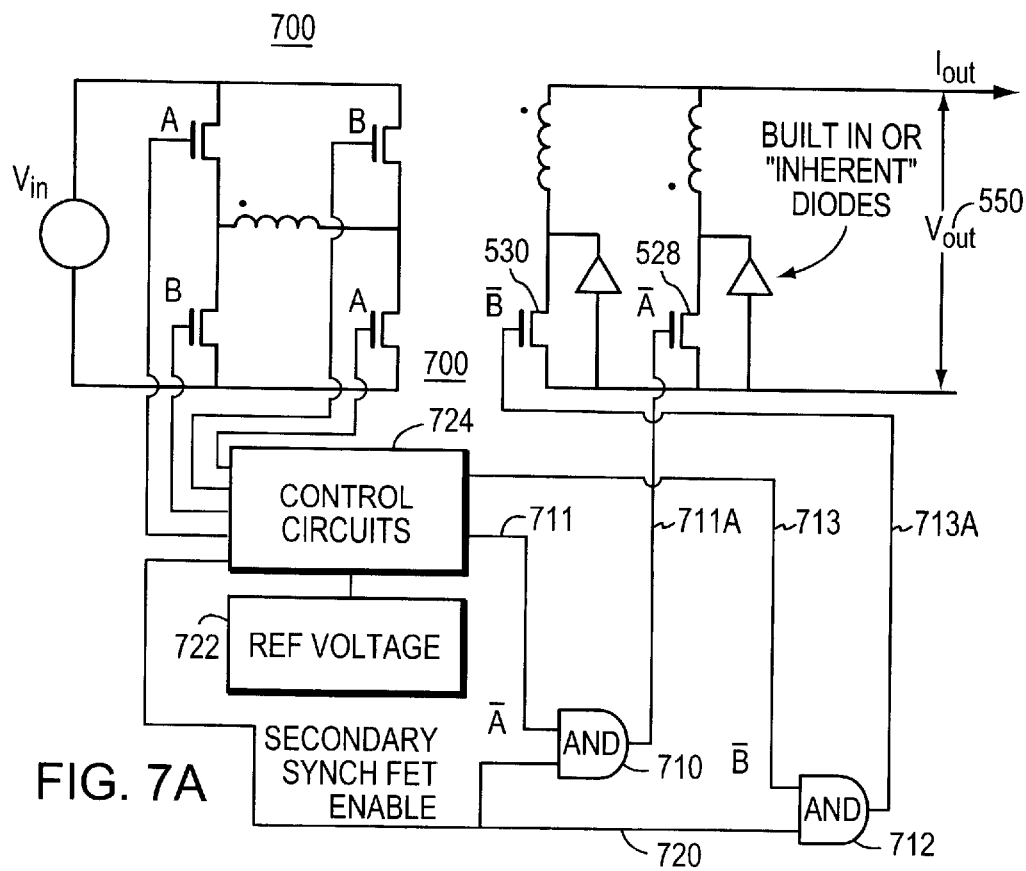
FIG. 7A a block diagram of a synch FET direct current to direct current power supply in accordance with the invention.

Turning now to FIG. 7A, the inventive synch FET power supply 700 is shown. The inventive addition of AND circuit 710 in the "not A" control line and the addition of AND circuit 712 in the "not B" control line is shown. The "not A" control signal shown in Graph 5B is applied to one input of AND gate 710, and a "secondary synch FET enable" signal 720 is applied to the other input of AND gate 710. The output 711A of AND gate 710 is used to turn "not A" switch 528 on.

The "not B" control signal shown in Graph 5C is applied to one input of AND gate 712, and the "secondary synch FET enable" signal 720 is applied to the other input of AND gate 712. The output 713A of AND gate 712 is used to turn "not B" switch 530 on.

Figure 7B:
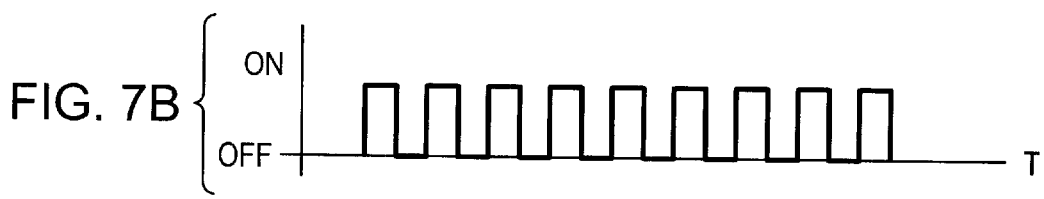
FIG. 7B is a graph showing voltage versus time.

FIG. 7B is a graph which illustrates either the "not A" signals shown in FIG. 5B, or the "not B" signals shown in FIG. 5C.

Figure 7C:
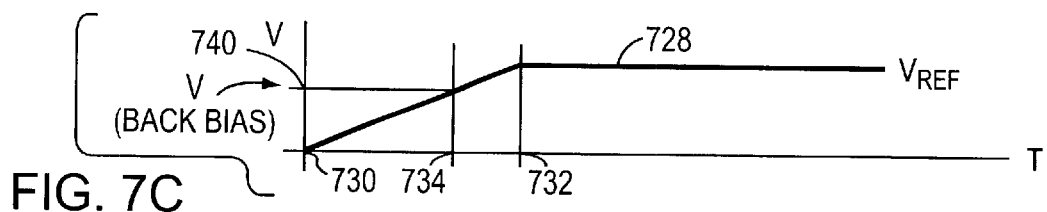
FIG. 7C is a graph showing voltage versus time.
Figure 7D:
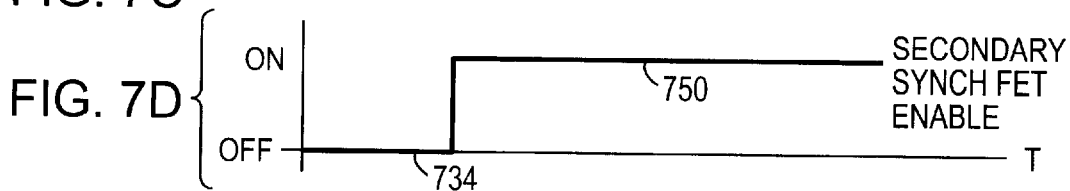
FIG. 7D is a graph showing voltage versus time.

FIG. 7C is a graph 728 which illustrates the increase of the reference voltage $V_{REF}$ from time 730 when soft start is switched on, and time 732 the time when the reference voltage reaches its maximum value and stabilizes. At time 734 the reference voltage 722, and also the output voltage 550, reaches the value of the back bias 740. The "secondary synch FET enable" signal is switched on at line 720 at time 734, enabling both AND gate 710 and AND gate 712, as shown by graph 750 of FIG. 7D.

Figure 7E:
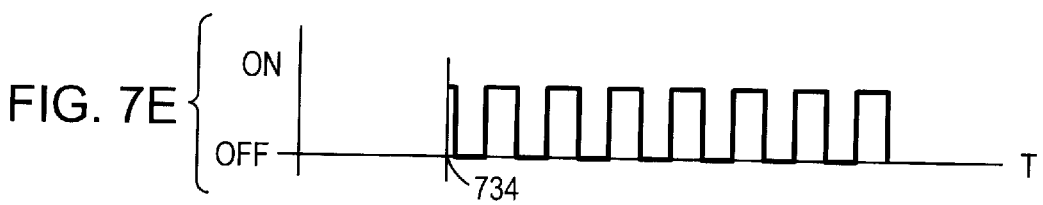
FIG. 7E is a graph showing voltage versus time.

Turning now to FIG. 7E, graph 760 shows either the drive pulses on line 711A to synch FET "not A" 528, or on line 713A to synch FET 530. The drive pulses on lines 711A and 713A are turned on at time 734, as shown in FIG. 7E. Control circuits 724 sense that the reference voltage, and hence the output voltage 550, has reached, or exceeded, the back bias voltage 740, and turn on the drive pulses on line 711A to switch 528, and on line 713A to switch 530 to turn on the output voltage 550. Control circuits 724 turn on the drive pulses on line 711A and 713A by raising the "secondary synch FET enable" signal on line 720, and thereby enabling the AND gate 710 and AND gate 712.

No reverse power flows into synch FET power supply 700 from the back bias source because the secondary switches 528, 530 are not connected to form a complete circuit until time 734, which is the time sensed by the control circuits 724 that the reference voltage has risen to a value for which the output voltage 550 exceeds the back bias voltage. When the output voltage 550 exceeds the back bias voltage, power only flows out of synch FET power supply 700, not into the power supply.

Control circuits 724 have a soft start circuit which applies reference voltage 722 gradually to a comparator to gradually raise the output voltage. The output voltage follows the reference voltage. In an exemplary embodiment of the invention, the output voltage may be made to match, that is equal, the reference voltage. In an alternative embodiment of the invention, the reference voltage is either greater or less than the desired output voltage, and a scaling circuit brings the output voltage to a desired value. The desired value is then scaled relative to the reference voltage.

Figure 8A:
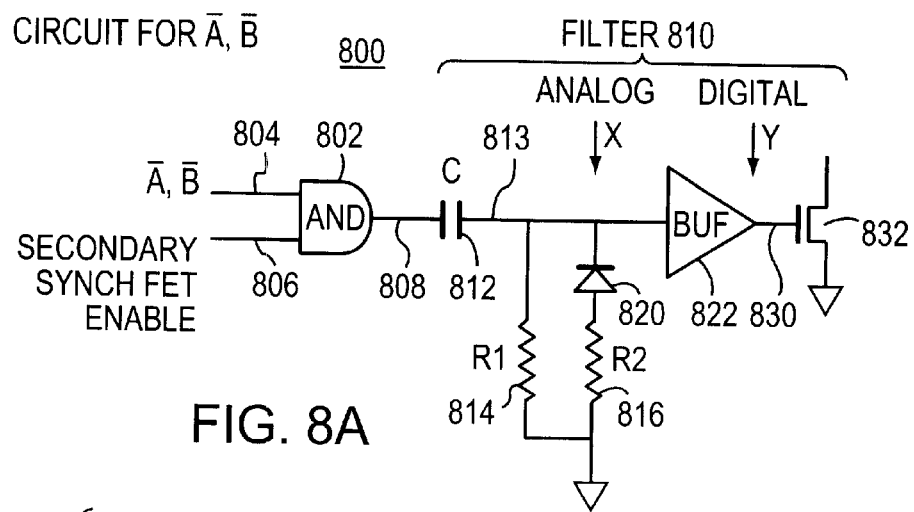
FIG. 8A is a block diagram of a circuit including a logical AND gate in accordance with the invention.

Turning now to FIG. 8A, there is shown circuit 800 which is an alternative embodiment of the invention. Either AND gate 710 or AND gate 712 is represented by AND gate 802. Input 804 of AND gate 802 connects to either the "not A" 711 or the "not B" 713 drive pulses as shown in FIG. 5. Input 806 of AND gate 802 is the "secondary FET enable" signal on line 720 of FIG. 7A.

The output 808 of AND gate 802 goes to a filter 810 made of capacitor C 812 and resistor R1 814, resistor R2 816, and diode 820. Filter 810 may be regarded as a "high pass" filter, where capacitor 812 charges rapidly through resistor R2 816 and diode 820, and capacitor C 812 discharges slowly through resistor R1 814. Buffer 822 has a trigger level and serves to convert the analog voltage at point X 813 to digital at point Y 830. FET switch 832 represents either "not A" FET switch 528 or "not B" FET switch 530.

Figure 8B:
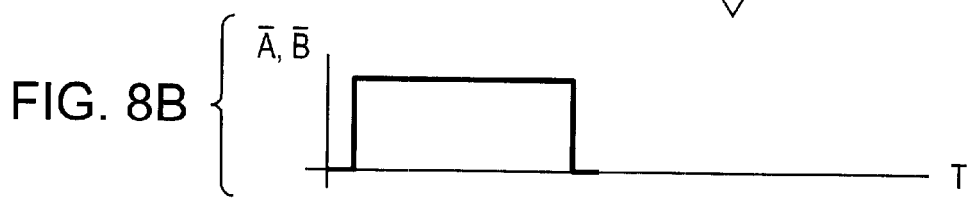
FIG. 8B is a graph showing voltage versus time.
Figure 8C:
FIG. 8C is a graph showing voltage versus time.

FIG. 8B is a graph and represents the "not A" and "not B" signals being on for a long time. Because of the high pass nature of the filter made up of capacitor C 812 and resistors R1 814, R2 816, the value of the signal at point Y 830 stays low as illustrated by the graph of FIG. 8C.

Figure 8D:
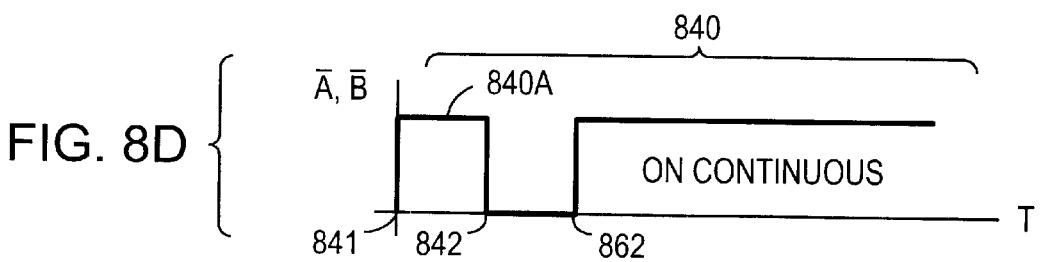
FIG. 8D is a graph showing voltage versus time.
Figure 8E:
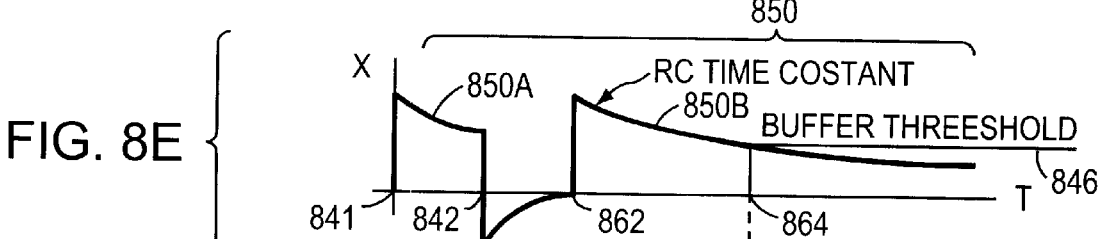
FIG. 8E is a graph showing voltage versus time.
Figure 8F:
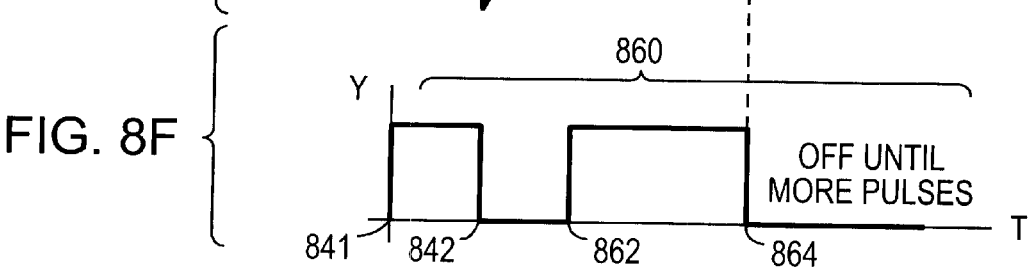
FIG. 8F is a graph showing voltage versus time.

Turning now to FIGS. 8D, 8E, and 8F the dynamic action of filter 810 in its action as a high pass filter is illustrated. The graph 840, at segment 840A illustrates a pulse appearing at output terminal 808 of AND gate 802. At time 841 the pulse turns on. At time 842 the pulse turns off. Graph 850 of FIG. 8E gives the voltage observed at point X 813. As output terminal 808 of AND gate 802 goes positive, as illustrated by segment 840A of graph 840 of FIG. 8D, capacitor C 812 charges rapidly (too rapidly to show other than as a vertical line on the time scale of FIG. 8E) through resistor R2 and diode 820. Between time 841 and time 842 capacitor C 812 discharges through resistor R1 814 as shown by segment 850B of graph 850.

At time 842 the output terminal 808 of AND gate 802 goes to zero Volts, capacitor C 812 thereby has its positive end connected to ground, and continues discharging through resistor R1 814, thereby driving point X 813 negative, and buffer 822 turns off, driving its output to zero Volts.

The graph 860 of FIG. 8F illustrates the voltage change at point Y 830, the output of buffer 822. While the output terminal 808 of AND gate 802 was high the buffer 822 was on, and held point Y 830 high. After output terminal 808 switched to zero, point X went negative, the input to buffer 822 was less than threshold voltage 846 of buffer 822. Since its input voltage went below its threshold voltage, buffer 822 switched its output to zero Volts, as shown after time 842 in FIG. 8F.

Graph 860, at time 862 illustrates a pathological condition which presents a problem solved by circuit 800. The pulse train normally presented to AND gate 802 goes on continuously at time 862. In some instances, it is possible for the control circuits to drive both the "not A" and the "not B" signals on continuously. This undesirable situation can occur when the control circuits attempt to reduce the output voltage by reducing the width of the "on" time of the primary switches, and as a consequence raise the "on" time of the secondary switches. This undesirable situation closes both secondary switches 528 and 530, and so shorts the secondary windings of the transformer.

When the "not A" drive pulses come on continuously, raising the output terminal 808 of AND gate 802 to continuous "on", then the capacitor C 812 discharges with the time constant of RC, where R is R1 814 and C is C 812. This discharge of capacitor C 812 is shown by the decreasing voltage at point X, as shown by segment 850B of graph 850. At time 864 the voltage at point X 813 falls below the threshold voltage 846 for buffer 822. Buffer 822 then switches its output to zero volts, or logical low, at time 864 as shown in the graph of FIG. 8F. Buffer 822 provides the drive current for FET switch 832, and so at time 864 turns off the FET switch 832. Both the "not A" and the "not B" FET switches in the secondary windings of the transformer will be turned off, and so the secondary windings will not be shorted together.

The action of filter 810 as a low pass filter is next described. In the event that pulses are presented at line 808 which are short in time relative to the charging time of capacitor C 812 through resistor R2, then capacitor C 812 cannot charge to a voltage high enough to exceed the threshold voltage of buffer 812. That is, the charging time constant of capacitor C 812 is given by the product RC, where C is the capacitance of capacitor 812 and R is the value of R2. As mentioned above, this charging time constant is normally chosen to be much less than the width of a pulse applied at line 808. However, in the alternative event that very short pulses are generated and applied to line 808 such that the length in time of the pulses are short relative to the charging time constant of C 812 through R2 816, then no output is generated by buffer 822 because capacitor C 812 does not charge to great enough voltage to exceed the threshold voltage of buffer 822. Thus, when very short pulses are applied to line 808 filter 810 acts as a low pass filter and generates no output in response to the very short input pulses.

Figure 9:
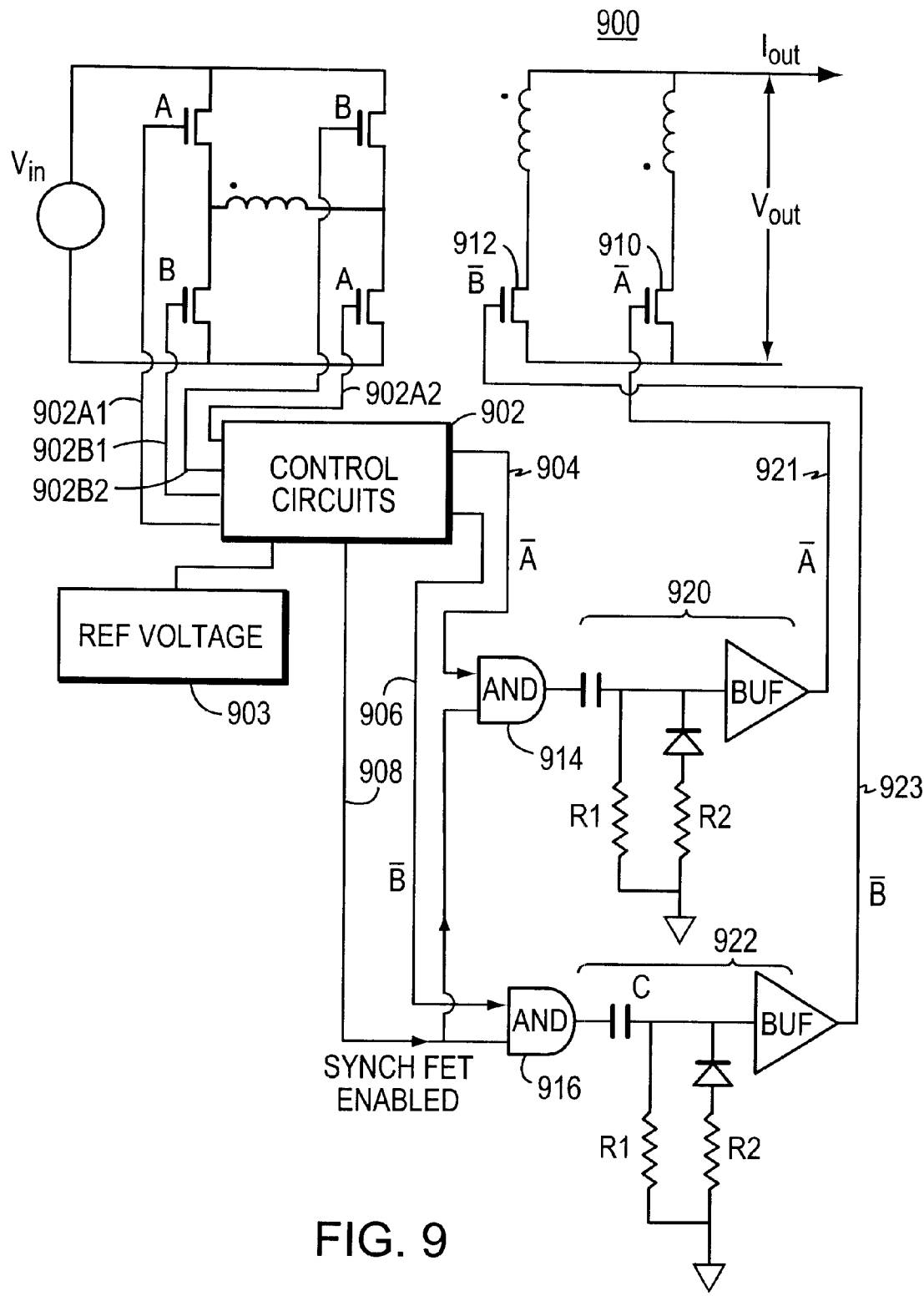
FIG. 9 is a block and schematic diagram of a synch FET power supply in accordance with the invention.

Turning now to FIG. 9, there is shown a schematic diagram 900 of circuits, such as circuits 800 having filter 810, which are used to generate the drive pulses of the "not A" and "not B" pulses for FET switches of a synch FET power supply. Control circuits 902 generate drive pulses for switches A along line 902A1 and line 902A2. Control circuits 902 generate drive pulses for switches B along lines 902B1 and 902B2. Control circuits 902 generate drive pulses for switch "not A" along line 904. Control circuits 902 generate drive pulses for switch "not B" along line 906. Enable signals for the "not A" switch 910 and the "not B" switch 912 are generated by control circuits 902 along line 908.

Switch cycles are adjusted by control circuits 902 so that the output voltage matches reference voltage 903.

When both enable line 908 is logically high and "not A" pulses are present on line 904, AND gate 914 applies pulses to filter 920. In the event that filter 920 passes the pulses, then "not A" pulses are delivered to line 921 by filter 920, and are applied to "not A" switch 910 by line 921.

Similarly, when both enable line 908 is logically high and "not B" pulses are present on line 906, AND gate 916 applies pulses to filter 922. In the event that filter 922 passes the pulses, then "not B" pulses are delivered to line 923 by filter 922, and are applied to "not B" switch 912 by line 923.

Figure 10A:
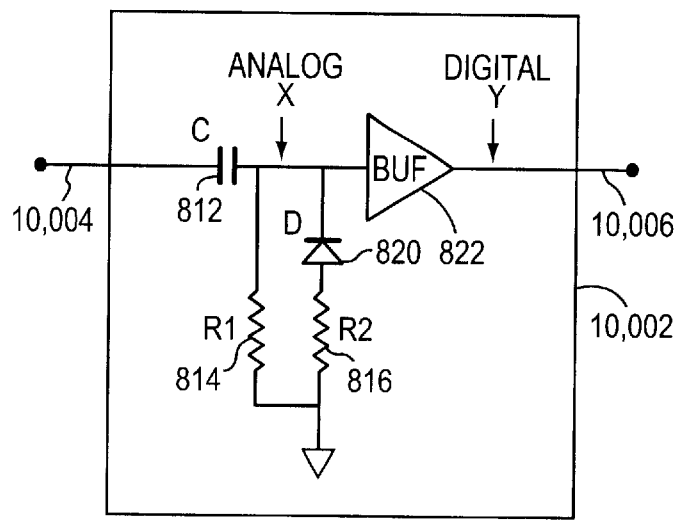
FIG. 10A is a schematic diagram of a filter circuit in a synch FET power supply.

Turning now to FIG. 10A, there is shown a filter 10,002 which is representative of filter 810, filter 920, filter 922 etc. Input line 10,004 may represent input line 808, input from AND gate 914, input from AND gate 916, etc. Output line 10,006 may represent output line 830, output line 921, output line 923, etc. The components of filter 10,002 are assigned the reference numerals of the components of the filter of circuit 800.

Figure 10B:
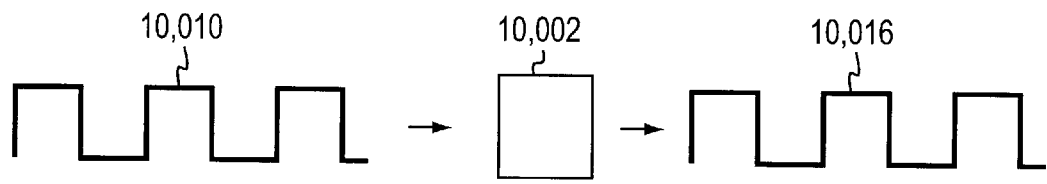
FIG. 10B is a graph of pulses into and out of a filter circuit.

Turning now FIG. 10B, there is shown normal operation of Filter 10,002. Pulses 10,010, which can be either "not A" pulses or "not B" pulses, are input to filter 10,002 through input 10,004. Pulses 10,010 are passed by filter 10,002 because they are sufficiently long in time to charge capacitor C 812 to above the threshold voltage for buffer 822 through resistor R2 816 and diode 820, and they are sufficiently short in time that capacitor C discharges at time 842 as shown in FIG. 8D and FIG. 8E, and they are not on continuously so that discharge of capacitor C 812 through resistor R1 814 does not prematurely cut off buffer 822. Accordingly, pulses 10,010 are passed by filter 10,002 and appear at output 10,006 as pulses 10,016.

Figure 10C:
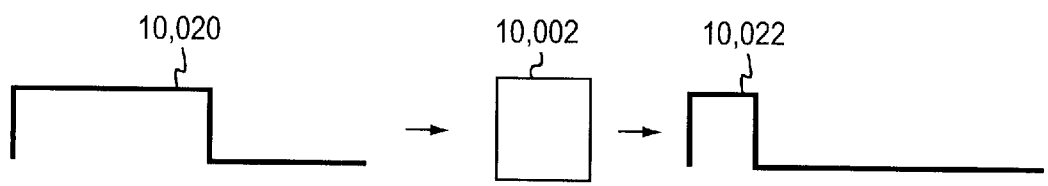
FIG. 10C is a graph of pulses into and out of a filter circuit.

Turning now to FIG. 10C, input pulse 10,020 is on for a very long time. Accordingly, discharge of capacitor C 812 cuts off buffer 822, and so produces a much shorter pulse as output pulse 10,022. FIG. 10C represents the input and output conditions where the input pulse is on essentially "continuously" in comparison with the discharge time constant of capacitor C 812 through resistor R1 814.

Figure 10D:
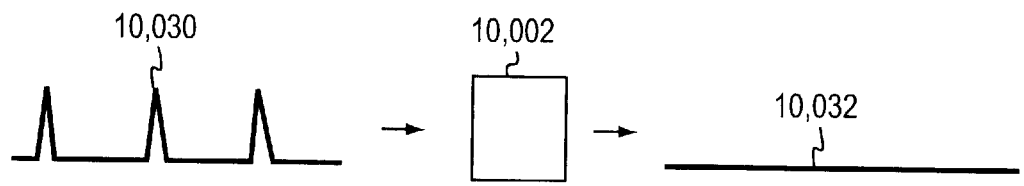
FIG. 10D is a graph of pulses into and out of a filter circuit.

Turning now to FIG. 10D, input pulses 10,030 are very short in time. Input pulses 10,030 are too short in time for capacitor C 812 to charge through resistor R2 816 to a voltage exceeding the threshold voltage of buffer 822. Accordingly, output 10,032 shows no output pulses. Filter 10,002 has eliminated very short pulses produced by control circuit 902, etc., so that the very short pulses do not operate "not A" switch 910 or "not B" switch 912.

It is to be understood that the above described embodiments are simply illustrative of the principles of the invention. Various other modifications and changes may be made by those skilled in the art which embody the principles of the invention and fall within the spirit and scope thereof.

What is claimed is:

1. A power supply, comprising:
   a transformer having a primary winding and a secondary winding;
   a first plurality of electronic switches to repeatedly connect said primary winding to a source of direct current;
   at least one second electronic switch to connect the secondary winding to an output bus;
   a control circuit to generate first electronic control signals to control said first plurality of electronic switches and second electronic signals to control said at least one second electronic switch;
   an AND circuit having said second electronic signals as an input, having an enable signal as an input, and having an output signal to drive said at least one second electronic switch, wherein an output is permitted by said AND circuit only when said enable signal is set to ENABLE; and
   a soft start circuit to gradually raise a reference voltage for controlling an output voltage of said power supply to follow said reference voltage, and said control circuit to turn on said enable signal after said reference voltage has reached a desired voltage value.

2. The apparatus as in claim 1, further comprising:
   a high pass filter, said high pass filter connected between said output of said AND circuit and said second at least one electronic switch, said high pass filter turning off said second at least one electronic switch after said first electronic control signals have been on for a predetermined time interval.

3. The apparatus as in claim 1, further comprising:

a low pass filter to prevent said second electronic signals from turning on said second electronic switch when the time duration of said second electronic signals is less than a desired time duration.

4. A method for operating a power supply, comprising:

generating drive signals for a plurality of electronic switches by a control circuit, a first set of said plurality of electronic switches alternately connecting and disconnecting a primary coil of a transformer to a source of electric power, and a second set of said plurality of electronic switches alternately connecting and disconnecting a secondary coil of said transformer to an output bus, to provide output direct current electric power at an output voltage at said output bus;

initiating soft start by gradually increasing a reference voltage so that said output voltage follows said reference voltage and gradually rises;

controlling said drive signals to said second set of electronic switches by a logic circuit, said logic circuit responsive to an enable signal;

turning on said second set of electronic switches by said enable signal in response to said output voltage reaching a desired voltage level.

5. The method of claim 4, wherein said second set of said plurality of electronic switches further comprises:

said secondary coil of said transformer is a center tapped secondary coil having a first secondary coil on a first side of said center tap and a second secondary coil on a second side of said center tap;

a first electronic switch to connect said first secondary coil of said transformer to said output bus and a second electronic switch to connect said second secondary coil of said transformer to said output bus.

6. A direct current power supply, comprising:

a plurality of electronic switches;

a control circuit to generate drive signals to turn on, and turn off, said plurality of electronic switches, a first set of said plurality of electronic switches alternately connecting and disconnecting at least one primary coil of a transformer to a source of electric power, and a second set of said plurality of electronic switches alternately connecting and disconnecting at least one secondary coil of a transformer to an output bus, to provide output direct current electric power at an output voltage at said output bus;

means for initiating soft start by gradually increasing a reference voltage so that said output voltage follows said reference voltage and gradually rises;

means for controlling said drive signals to said second set of electronic switches by a logic circuit, said logic circuit responsive to an enable signal;

means for turning on said second set of electronic switches by said enable signal in response to said output voltage reaching a desired voltage level.

7. A system of power supplies, comprising:

a first power supply providing a first output voltage on a first output bus;

a second power supply providing a second output voltage on a second output bus, said second output voltage greater than said first output voltage;

means for said second output bus to maintain a supply of power on said first output bus at a third voltage, said third voltage related to said second output voltage so that in the event that said second output voltage is switched on in the absence of said first output voltage being switched on, said second output voltage is prevented from applying an undesired large voltage to components normally supplied with power by said first output bus; and means for preventing said first power supply from supplying output power until a time that said first output voltage will exceed said third voltage in order to prevent power from said second power supply from flowing into said first power supply.

8. The system as in claim 7, wherein said means for preventing said first power supply from supplying output power, further comprises:

in said first power supply, at least one electronic switch to connect and disconnect a secondary coil of a transformer to said first output bus to generate electric power on said first output bus;

a logic circuit, said logic circuit responsive to an enable signal, said enable signal required to be set to ENABLE for said first power supply to have a complete circuit with said first output bus and so to deliver power to said first output bus; and means for setting said enable signal to ENABLE in response to an output voltage of said first power supply exceeding said third voltage, thereby preventing power from said second power supply from flowing into said first power supply.

9. The system as in claim 7, further comprising:

a first soft start circuit to gradually increase a first reference voltage in said first power supply, said first output voltage following said first reference voltage;

a second soft start circuit to gradually increase a second reference voltage in said second power supply, said second output voltage following said second reference voltage;

means for said second power supply to bring said first bus to said third voltage;

means, responsive to said third voltage and said first reference voltage, to enable output from said first power supply when said first output voltage exceeds said third voltage.

10. A method for operating a system of power supplies, the method comprising the steps:

providing a first output voltage on a first output bus by a first power supply;

providing a second output voltage on a second output bus by a second power supply, said second output voltage greater than said first output voltage;

maintaining a supply of power on said first output bus at a third voltage by said second power supply, said third voltage related to said second output voltage so that in the event that said second output voltage is switched on in the absence of said first output voltage being switched on, said second output voltage is prevented from applying an undesired large voltage to components normally supplied with power by said first output bus; and preventing said first power supply from supplying output power until a time that said first output voltage will exceed said third voltage in order to prevent power from said second power supply from flowing into said first power supply.

11. The method as in claim 10, further comprising:

connecting and disconnecting a secondary coil of a transformer to said first output bus to generate electric power on said first output bus, said connecting and disconnecting done by at least one electronic switch in said first power supply;

enabling a logic circuit by an enable signal, said enable signal required to be set to ENABLE for said first power supply to have a complete circuit with said first output bus and so to deliver power to said first output bus; and setting said enable signal to ENABLE in response to an output voltage of said first power supply exceeding said third voltage, thereby preventing power from said second power supply from flowing into said first power supply.

12. The method as in claim 10, further comprising:

gradually increasing a first reference voltage in said first power supply by a first soft start circuit, said first output voltage following said first reference voltage;

gradually increasing a second reference voltage in said second power supply by a second soft start circuit, said second output voltage following said second reference voltage;

bringing said first bus to said third voltage by said second power supply;

enabling, in response to said third voltage and said first reference voltage, output from said first power supply when said first output voltage exceeds said third voltage.

* * * * *